United States Patent
Yoneda et al.

[11] Patent Number: 5,991,116
[45] Date of Patent: Nov. 23, 1999

[54] MECHANISM FOR DRAWING OUT TAPE

[75] Inventors: Haruhiko Yoneda, Daito; Shinichiro Okamura, Shijonawate, both of Japan

[73] Assignee: Sanyo Electronic Co., Ltd., Moriguchi, Japan

[21] Appl. No.: 09/081,056

[22] Filed: May 19, 1998

[30]  Foreign Application Priority Data

May 21, 1997 [JP]  Japan ..................................... 9-130630

[51] Int. Cl.$^6$ .......................... G11B 15/665; G11B 15/43
[52] U.S. Cl. ................................................. 360/85; 360/95
[58] Field of Search ................................. 360/83, 84, 85, 360/95, 93, 96.1, 96.5

[56]  References Cited

U.S. PATENT DOCUMENTS

| | | | |
|---|---|---|---|
| 4,964,002 | 10/1990 | Nakamichi | 360/95 |
| 4,991,039 | 2/1991 | Kaku | 360/95 |
| 5,430,585 | 7/1995 | Takada et al. | 360/85 |
| 5,434,726 | 7/1995 | Song | 360/85 |
| 5,612,836 | 3/1997 | Kim et al. | 360/85 |
| 5,731,925 | 3/1998 | Kobayashi | 360/85 |
| 5,781,366 | 7/1998 | Matsuoka | 360/85 |

FOREIGN PATENT DOCUMENTS

3-147557  6/1991  Japan.
4-298847 10/1992  Japan.

*Primary Examiner*—David L. Ometz
*Attorney, Agent, or Firm*—Armstrong, Westerman, Hattori, McLeland & Naughton

[57]  ABSTRACT

A tape drawing-out mechanism for positioning a magnetic tape 91 as tensioned in a specified path of travel has a drive lever 6 having a cam follower 62 projecting therefrom, a tape drawing-out lever 5 having a tape drawing-out pin 51 for receiving the force of the drive lever 6 in a first step of a tape drawing-out movement, and an auxiliary lever 7 for receiving the force of the drive lever 6 in a second step of the tape drawing-out movement. The auxiliary lever 7 has a pin 71 projecting therefrom for pressing a face 54 provided on the tape drawing-out lever 5 to pivotally move the lever 5 to a tape drawing-out end position. The mechanism described precludes a great reaction from acting on the cam follower 62 and a cam groove 41 for giving a tape drawing-out drive force.

6 Claims, 9 Drawing Sheets

MECHANISM FOR DRAWING OUT TAPE

FIELD OF THE INVENTION

The present invention relates to signal recording-reproduction apparatus, such as VCRs (video cassette recorders) wherein a tape serving as a recording medium is caused to travel under tension along a specified path to scan the signal bearing surface of the tape for recording and/or reproducing signals, and more particularly to a mechanism for drawing out such a tape from a cassette.

BACKGROUND OF THE INVENTION

Figure 9:
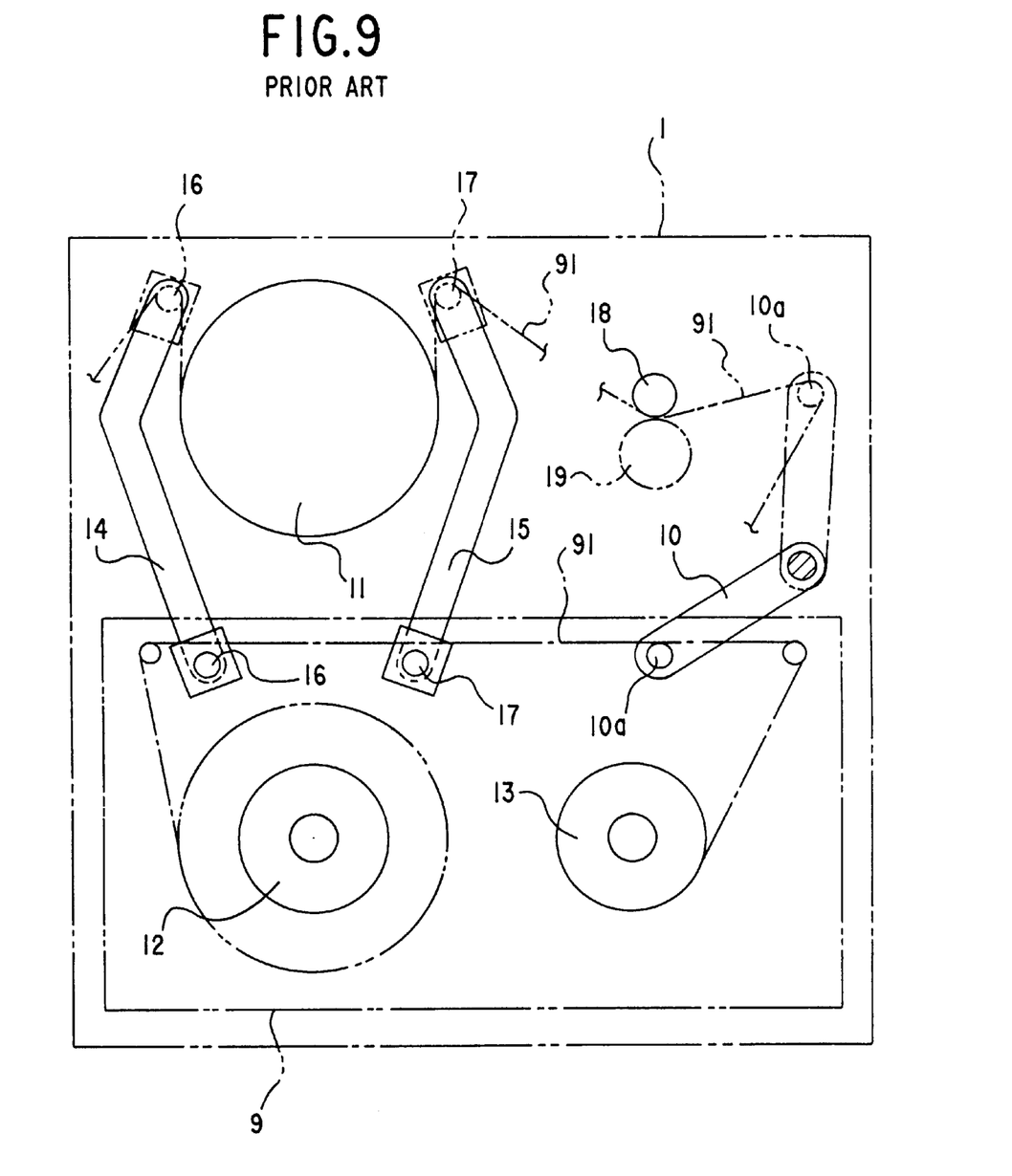
FIG. 9 is a plan view showing the arrangement of main components of a VCR.

As shown in FIG. 9, VCRs have mounted on a chassis 1 a rotary head cylinder 11 incorporating a rotary magnetic head (not shown) and a pair of reel supports 12, 13 for rotatingly driving the reels of a tape cassette 9. The chassis 1 is formed at opposite sides of the cylinder 11 with a pair of guide slits 14, 15 having slidably fitted therein a pair of leading guides 16, 17 for winding the magnetic tape 91 of the cassette 9 around the rotary head cylinder 11. Further disposed at the right side of the cylinder 11 is a tape drawing-out lever 10 pivotally supported so as to be movable between a tape drawing-out start position and a tape drawing-out end position and provided with a pin 10a for drawing out the magnetic tape 91 from the cassette 9.

An unillustrated drive control mechanism drivingly advances the leading guides 16, 17 and pivotally moves the lever 10 from the drawing-out start position indicated in solid lines to the drawing-out end position indicated in chain lines, whereby the magnetic tape 91 is positioned along a specified path of travel under tension. The tape as held between a capstan 18 and a pinch roller 19 is driven longitudinally thereof by the rotation of the capstan 18.

Figure 8:
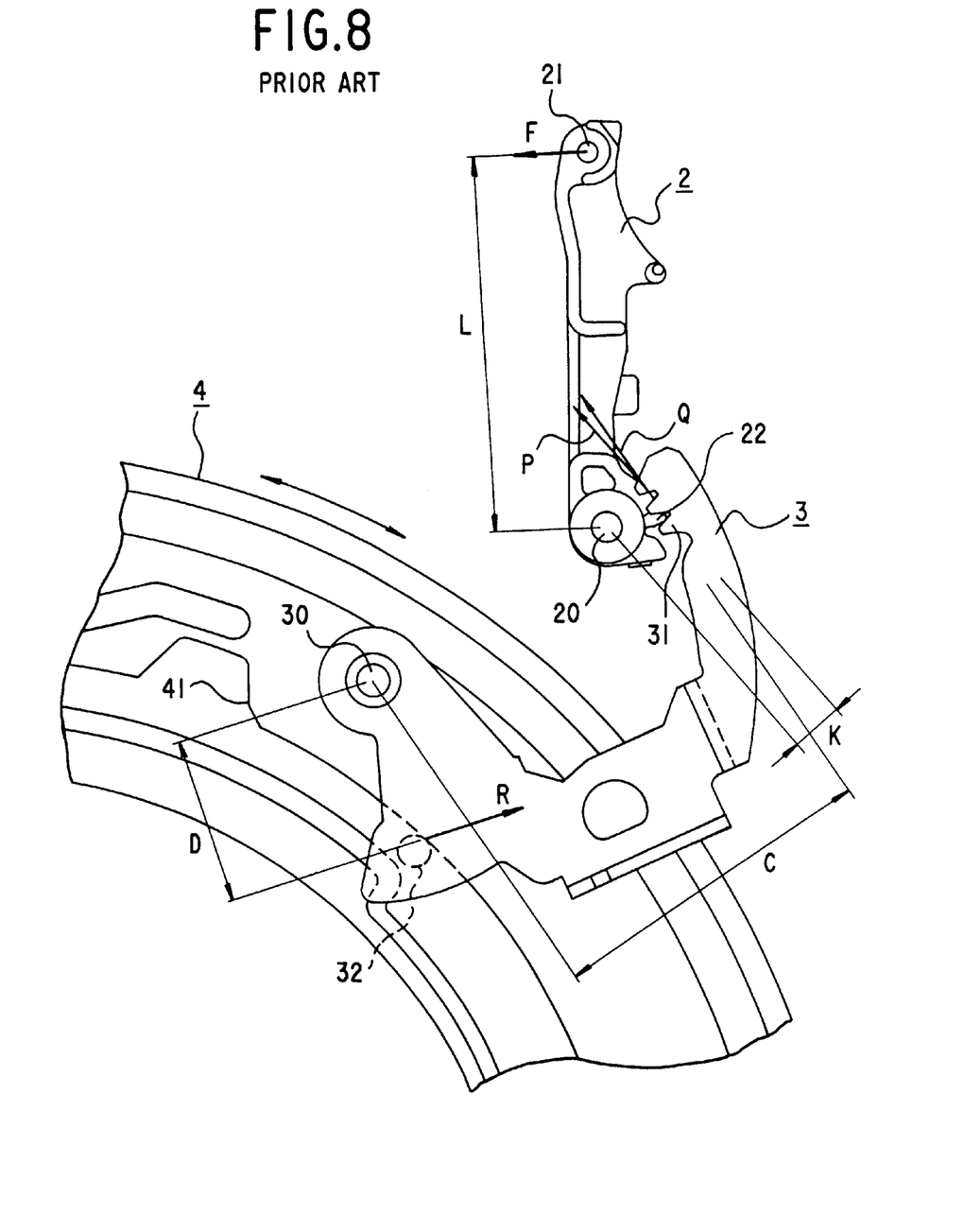
FIG. 8 is a plan view showing a conventional tape drawing-out mechanism with a tape completely drawn out.

FIG. 8 shows a tape drawing-out mechanism previously developed by the present applicant.

Disposed on the rear side of the chassis is a drive control plate 4 to be reciprocatingly driven by a motor (not shown). A tape drawing-out lever 2 is supported at its base end by a first pivot 20 on the chassis. A drive lever 3 is supported at its base end by a second pivot 30. The lever 2 has an outer end carrying a pin 21 for drawing out the tape and a driven gear portion 22 formed at its base end. The drive lever 3 has a forward end formed with a drive gear portion 31 always in mesh with the driven gear portion 22 of the lever 2. The drive lever 3 has a cam follower 32 projecting downward from an intermediate portion thereof and extending through the chassis to engage in a cam groove 41 formed in the drive control plate 4.

With the tape drawing-out mechanism described, the control plate 4 rotates counterclockwise, thereby causing the cam groove 41 to drive the cam follower 32 of the drive lever 3 and rotate the drive lever 3 clockwise. With this rotation, the drive gear portion 31 of the drive lever 3 drivingly rotates the driven gear portion 22 of the tape drawing-out lever 2 clockwise, moving the lever 2 from the tape drawing-out start position to the illustrated tape drawing-out end position. As a result, the magnetic tape is drawn out of the tape cassette and positioned along the specified path under tension.

In the tape drawing-out mechanism shown in FIG. 8, the force F exerted by the tension of the magnetic tape on the tape drawing-out pin 21 on the lever 2 is first amplified to a reaction P shown in accordance with the ratio between the radius L of gyration of the pin 21 and the radius K of pitch circle of the driven gear portion 22. The force Q exerted by this reaction P on the drive gear portion 31 is amplified to a reaction R shown and acting on the cam follower 32, at a ratio determined by the radius C of pitch circle of the drive gear portion 31 and the radius D of gyration of the cam follower 32. The reaction R is about 10 to about 20 times the original force F, and the cam face defining the cam groove 41 is pressed by this amplified reaction R.

Consequently, the cam face defining the cam groove 41 wears away early, presenting the problem that the pin 21 fails to draw out the tape to an accurate position.

SUMMARY OF THE INVENTION

An object of the present invention is to provide a mechanism for drawing out a tape to a highly accurate position without permitting a great reaction to act on the drive means for drawing out the tape.

The present invention provides a mechanism for drawing out a tape comprising:

drive means for giving a drive force for drawing out the tape, a drive lever 6 pivotally supported at a base end thereof on the chassis 1 and pivotally movable between a drive start position and a drive end position for receiving the drive force from the drive means;

a tape drawing-out lever 5 having an outer end provided with a tape drawing-out pin 51 and a base end pivotally supported on the chassis 1 and pivotally movable between a tape drawing-out start position and a tape drawing-out end position, a forward end portion of the drive lever 6 being engageable with the base end of the drawing-out lever 5 in a first step of a tape drawing-out movement to transmit the force of the drive lever 6 to the tape drawing-out lever 5;

an auxiliary lever 7 pivotally supported at a base end thereof on the chassis 1 and pivotally movable between an initial position and a final position, a forward end of the drive lever 6 being engageable with a forward end of the auxiliary lever 7 in a second step of the tape drawing-out movement to transmit the force of the drive lever 6 to the auxiliary lever 7, the auxiliary lever 7 being formed with a pressing face for pressing an intermediate portion of the tape drawing-out lever 5 with the movement from the initial position to the final position to move the tape drawing-out lever 5 to the tape drawing-out end position.

In the tape drawing-out mechanism of the invention described, the drive lever 6, when driven by the drive means from the drive start position to the drive end position, moves the tape drawing-out lever 5 from the tape drawing-out start position to the tape drawing-out end position. In the first step of this tape drawing-out movement, the forward end portion of the drive lever 6 is in engagement with the base end of the drawing-out lever 5, moving the lever 5 from the drawing-out start position toward the drawing-out end position by the rotation of the drive lever 6. With the subsequent transition of the tape drawing-out movement to the second step, the forward end portion of the drive lever 6 disengages from the base end of the drawing-out lever 5, and the forward end of the drive lever 6 engages with the forward end of the auxiliary lever 7. In the second step, the force of the drive lever 6 drives the auxiliary lever 7, moving this lever 7 from the initial position to the final position. In this process, the pressing face of the auxiliary lever 7 presses the intermediate portion of the tape drawing-out lever 5, moving the lever 5 to the tape drawing-out end position and retaining the lever 5 in this end position.

When the tape is thus completely drawn out, the pressing face of the auxiliary lever 7 holds the tape drawing-out lever 5 in the drawing-out end position by pressing contact with the intermediate portion of the lever 5, so that the force exerted by the tension of the tape on the drawing-out pin 51 on the drawing-out lever 5 is first amplified at a ratio between the radius of gyration of the pin 51 and the radius of gyration of the point on the intermediate portion pressed by the pressing face to act on the pressing face of the auxiliary lever 7. The acting force is resolved into an axial force acting toward the center of rotation of the lever 7 and torque at a right angle with the axial force. The torque is transmitted to the drive lever 6 through the engagement between the lever 7 and the lever 6. The radius of gyration of the pressed point of the drawing-out lever 5 is sufficiently greater than the radius of gyration of the portion of engagement between the conventional tape drawing-out lever and the conventional drive lever, so that the reaction acting on the forward end of the drive lever 6 is sufficiently smaller than the reaction to which the forward end of the conventional drive lever is subjected.

Incidentally, the ratio of amplification which is dependent on the ratio between the radius of gyration of the forward end of the drive lever 6 and that of the driven portion of the lever 6 is not greatly different from the corresponding conventional ratio.

Consequently, the reaction acting on the drive means for driving the drive lever, with the tape drawn out, is greatly diminished as compared with the reaction on the conventional drive means.

Stated more specifically, the drive lever 6 is formed with a drive gear portion 61 at the forward end portion thereof, while the tape drawing-out lever 5 is formed at its base end with a driven gear portion 52 meshable with the drive gear portion 61 of the drive lever 6, and the drive gear portion 61 of the drive lever 6 meshes with the driven gear portion 52 in the first step of the tape drawing-out movement.

With the mechanism of this specific construction, the meshing engagement of the drive gear portion 61 of the drive lever 6 with the driven gear portion 52 of the tape drawing-out lever 5 transmits the force of the drive lever 6 to the drawing-out lever 5, whereby the lever 5 is driven to perform the first step of the tape drawing-out movement. The gear portions are disengaged with the subsequent transition of the tape drawing-out movement to the second step.

Further stated more specifically, the forward end of the drive lever 6 and the forward end of the auxiliary lever 7 are respectively formed with hooks 64, 73 meshable with each other in the second step of the tape drawing-out movement.

With this specific construction, the hook 64 of the drive lever 6 comes into engagement with the hook 73 of the auxiliary lever 7 in the second step of the tape drawing-out movement, whereby these levers 6, 7 are joined. Consequently, the force of the drive lever 6 is transmitted to the auxiliary lever 7 to drive the lever 7.

Further stated more specifically, the drive means comprises a cam groove 41 formed in a drive control plate 4 to be reciprocatingly driven, and a cam follower 62 projecting from an intermediate portion of the drive lever 6 and engaged in the cam groove 41.

With this specific arrangement, the movement of the cam groove 41 of the drive control plate 4 drives the cam follower 62 of the drive lever 6, moving the lever 6 from the drive start position to the drive end position.

Further stated more specifically, the tape drawing-out lever 5 is biased by a spring from the tape drawing-out end position toward the tape drawing-out start position. The auxiliary lever 7 is also biased by a spring from the final position toward the initial position.

In pivotally moving the tape drawing-out lever 5 from the drawing-out end position to the drawing-out start position by operating the drive means in a direction opposite to the tape drawing-out operation, the lever 5 is moved from the end position to the start position by being biased by the spring until the base end of the lever 5 comes into engagement with the forward end portion of the drive lever 6. The auxiliary lever 7 moves from the final position to the initial position by being biased by the spring.

Thus with the tape drawing-out mechanism embodying the present invention, the reaction acting on the drive means for driving the drive lever is much smaller than conventionally, rendering the drive means free of the problem of being worn away early by the reaction and allowing the tape drawing-out pin to draw out the tape to the specified position with high accuracy.

DETAILED DESCRIPTION OF THE PREFERRED EMBODIMENTS

A detailed description will be given of a tape drawing-out mechanism embodying the invention for use in a VCR.

Figure 1:
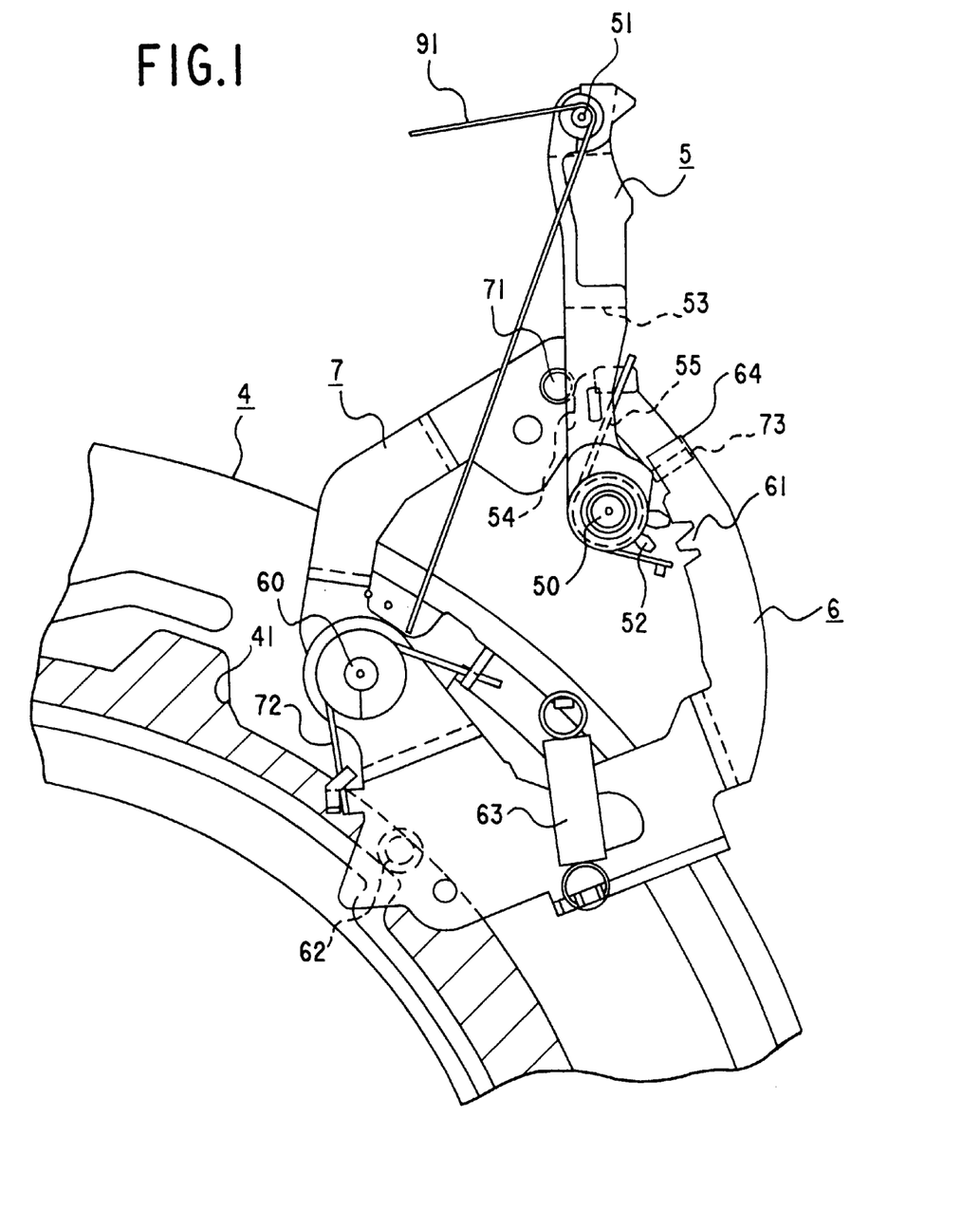
FIG. 1 is a plan view showing a tape drawing-out mechanism of the invention with a tape completely drawn out.

FIG. 1 shows the tape drawing-out mechanism according to the invention, with a magnetic tape 91 completely drawn out. A drive control plate 4 is disposed on the rear side of a chassis (not shown) provided with various mechanisms. The drive control plate 4 is reciprocatingly driven on a circumferential line by a motor (not shown).

An approximately I-shaped tape drawing-out lever 5 is supported at a base end thereof by a first pivot 50 provided on the chassis, and is biased into counterclockwise rotation by a torsion spring 55 attached to the pivot 50. A reverse C-shaped drive lever 6 is supported at a base end thereof by a second pivot 60 on the chassis. A C-shaped auxiliary lever 7 has a base end supported also by the pivot 60. The drive lever 6 is biased into counterclockwise rotation by a coiled spring 63 attached to the chassis and the lever 6. The auxiliary lever 7 is also biased into counterclockwise rotation by a torsion spring 72 mounted on the pivot 60.

The tape drawing-out lever 5 has a tape drawing-out pin 51 projecting from an outer end thereof and is formed with a driven gear portion 52 on the right side of its base end. The drive lever 6 has an L-shaped hook 64 formed at a forward end thereof, and a drive gear portion 61 formed on the left side of a forward end portion thereof and meshable with the driven gear portion 52 of the drawing-out lever 5. In the vicinity of the pivot 60, the drive lever 6 further has a cam follower 62 projecting downward therefrom and engaged in a cam groove 41 of the drive control plate 4. The cam groove 41 is hatched in FIG. 1 to indicate its region.

The auxiliary lever 7 has an L-shaped hook 73 formed at a forward end thereof and engageable with the hook 64 of the drive lever 6. The lever 7 also has a pressing pin 71 projecting upward therefrom and positioned slightly closer to its forward end. On the other hand, the tape drawing-out lever 5 is formed on its rear side with a recessed portion 53 for permitting the pressing pin 71 to pass therethrough in a first step of the tape drawing-out movement to be described below. The recessed portion 53 has a side face serving as the face 54 to be pressed by the pin 71 in sliding contact therewith in the second step of the drawing-out movement.

FIG. 3(a) to FIG. 7(b) show the tape drawing-out movement of the drawing-out mechanism described.

Figure 3A:
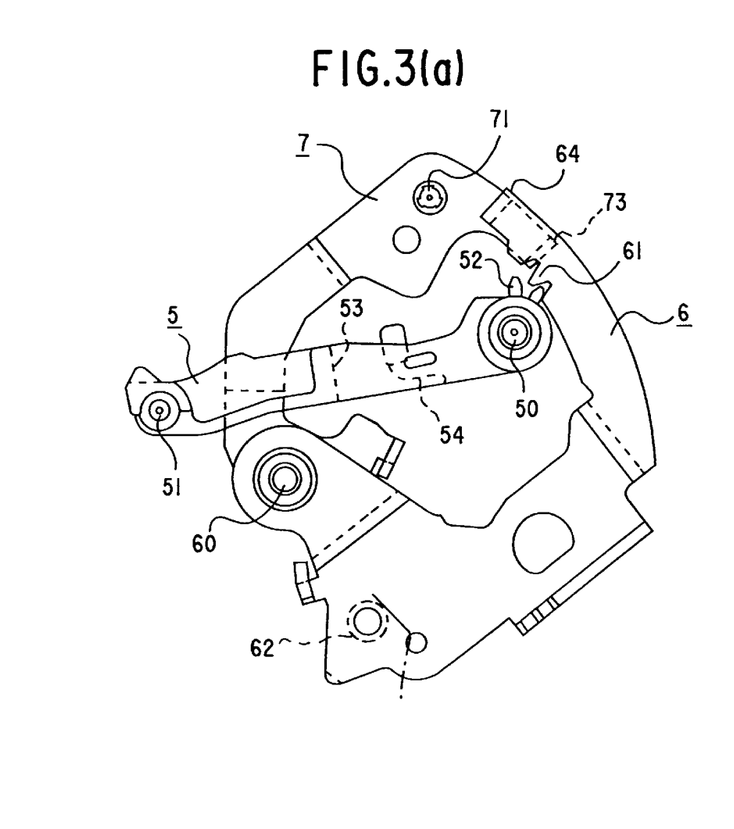
FIGS. 3(a) and 3(b) are views showing an initial step of a tape drawing-out movement.
Figure 3B:
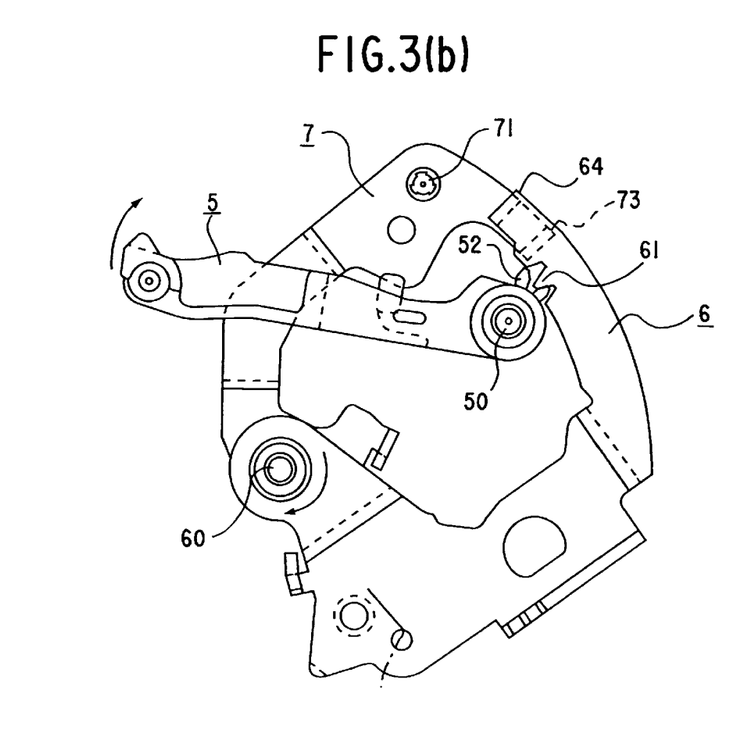

When stating to draw out the tape, the drive lever 6 is in a drive start position, the tape drawing-out lever 5 in a tape drawing-out start position and the auxiliary lever 7 in an initial position as seen in FIG. 3(a). The drive gear portion 61 of the drive lever 6 is in mesh with the driven gear portion 52 of the drawing-out lever 5. The hook 64 of the drive lever 6 is away from the hook 73 of the auxiliary lever 7. In this state, the drive control plate 4 rotates clockwise, moving the cam groove 41 in one direction on a circumferential line and thereby driving the cam follower 62 of the drive lever 6. The lever 6 starts to move clockwise.

In the first step shown in FIG. 3(a) to FIG. 5(b), the clockwise movement of the drive lever 6 causes the drive gear portion 61 of the lever 6 to drive the driven gear portion 52 of the drawing-out lever 5, whereby the lever 5 is moved clockwise, causing the pin 51 on the lever 5 to draw out the magnetic tape 91 from the cassette.

During the process shown in FIG. 3(b) to FIG. 4(b), the auxiliary lever 7 remains at rest in the initial position, while the hook 64 of the drive lever 6 approaches the hook 73 of the auxiliary lever 7. In the stage shown in FIG. 5(b), the meshing engagement between the drive gear portion 61 of the lever 6 and the driven gear portion 52 of the lever 5 takes place at a terminal position. Immediately prior to this, the hook 64 of the drive lever 6 comes into engagement with the hook 73 of the auxiliary lever 7.

Figure 4A:
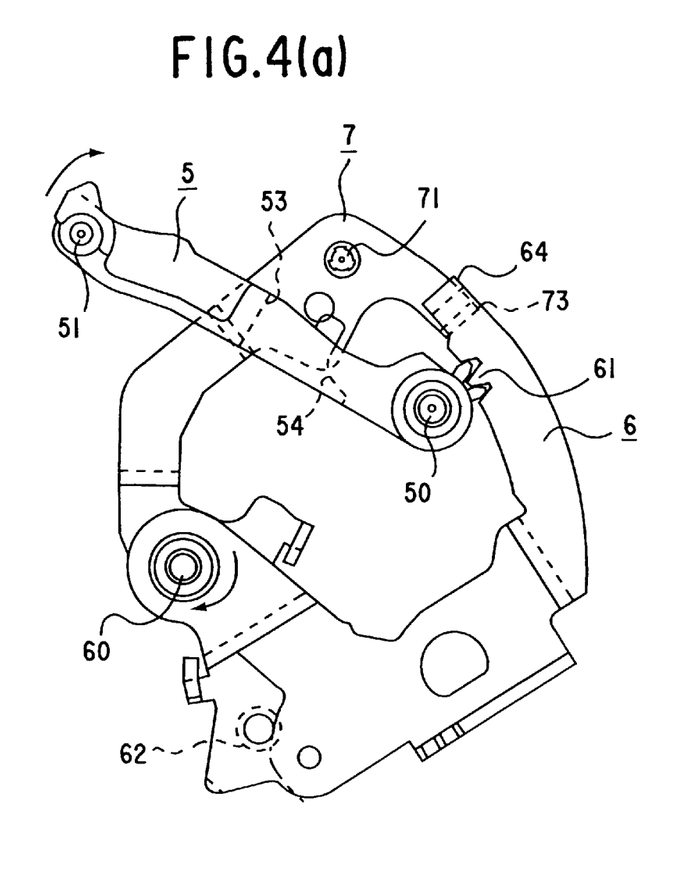
FIGS. 4(a) and 4(b) are views showing an intermediate step following the step of FIGS. 3(a) and 3(b)
Figure 4B:
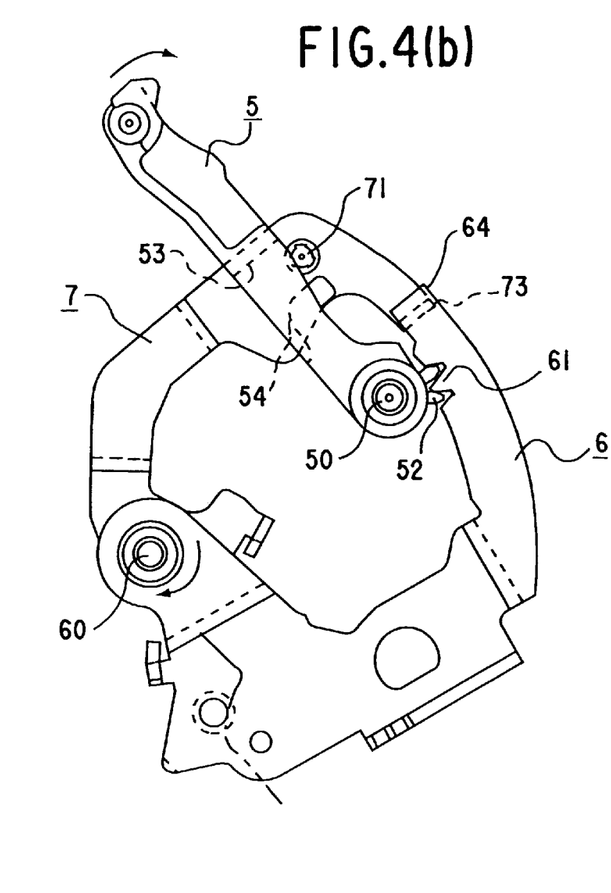
Figure 5A:
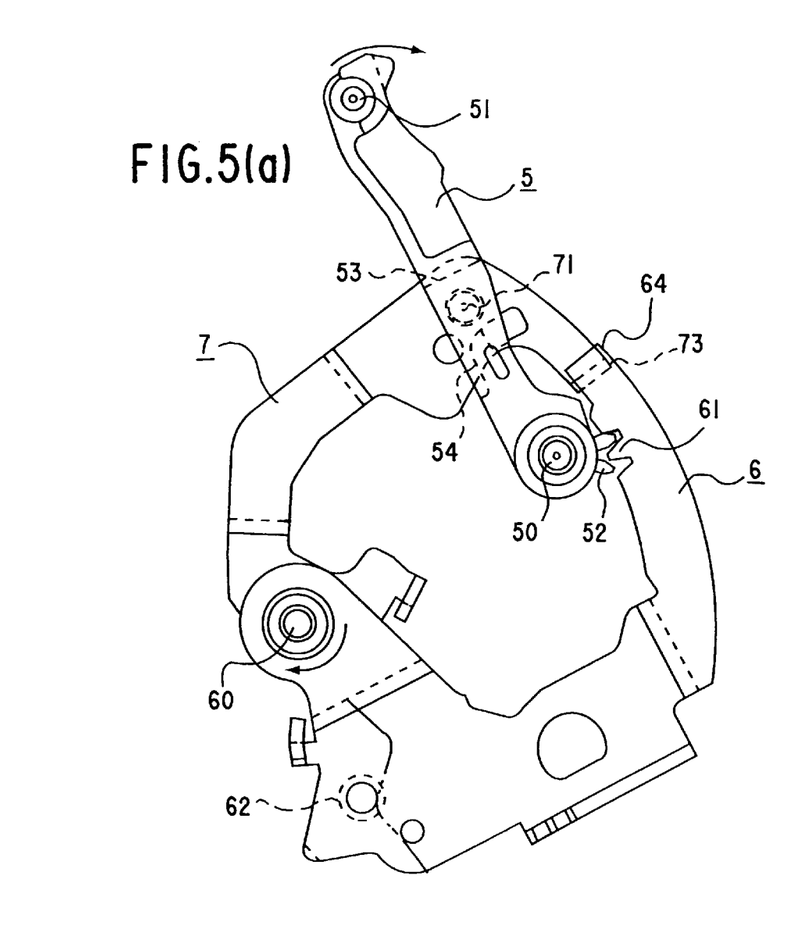
FIGS. 5(a) and 5(b) are views showing an intermediate step following the step of FIGS. 4(a) and 4(b)
Figure 5B:
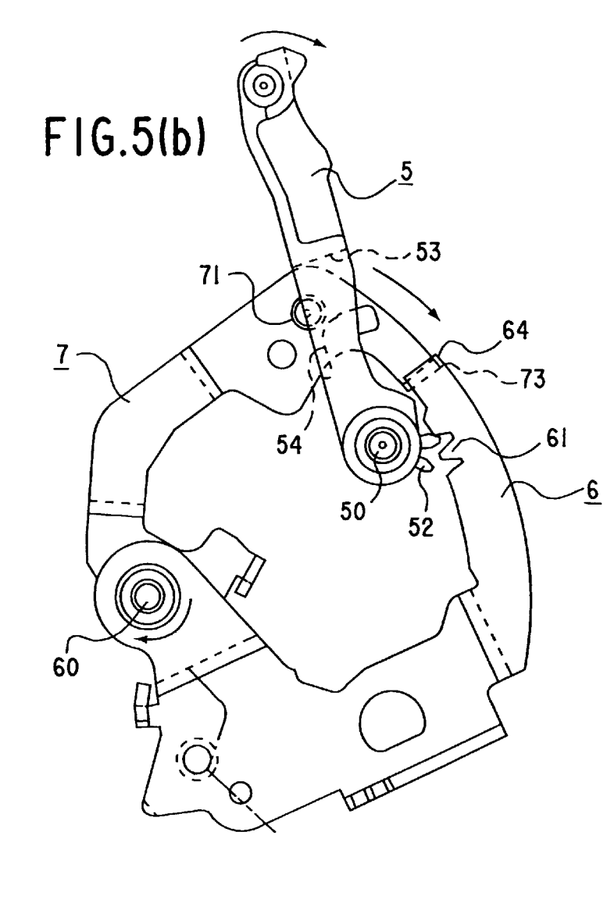

In the course of the pivotal movement of the drawing-out lever 5 shown in FIGS. 4(b) and 5(a), the pressing pin 71 of the auxiliary lever 7 is accommodated in the recessed portion 53 of the lever 5, whereby the interference between the levers 5 and 7 is avoided.

In the second step shown in FIG. 5(b) to FIG. 7(b), the drive lever 6 further moves clockwise, causing the hook 64 of the lever 6 to pull the hook 73 of the auxiliary lever 7 to move the lever 7 clockwise.

Figure 6A:
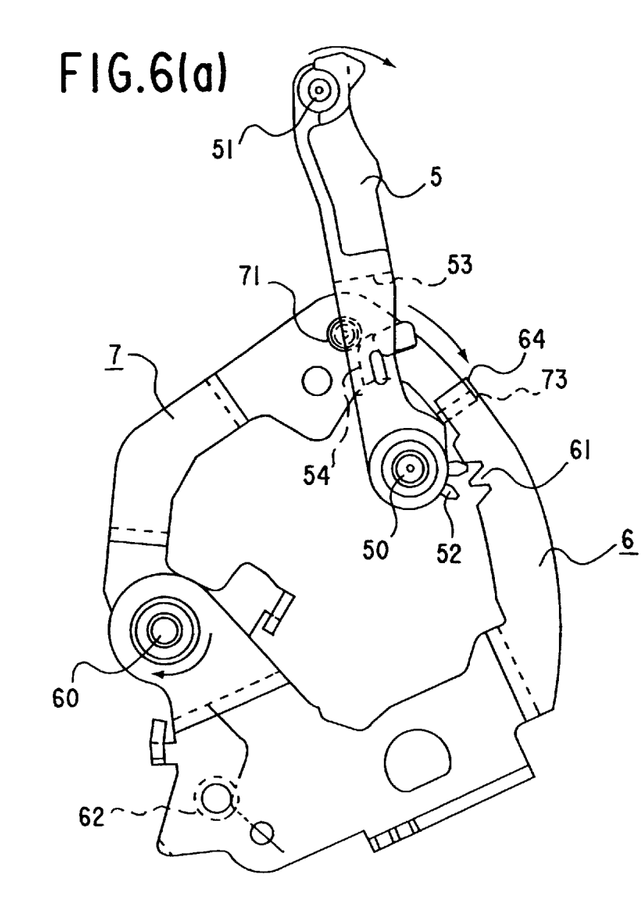
FIGS. 6(a) and 6(b) are views showing an intermediate step following the step of FIGS. 5(a) and 5(b)

With the clockwise movement of the auxiliary lever 7, the pressing pin 71 thereon approaches the pressed face 54 of the drawing-out lever 5, coming into sliding contact with the pressed face 54 of the lever 5 when the driven gear portion 52 of the lever 5 is released from the meshing engagement with the drive gear portion 61 of the drive lever 6 as seen in FIG. 6(a).

Figure 6B:
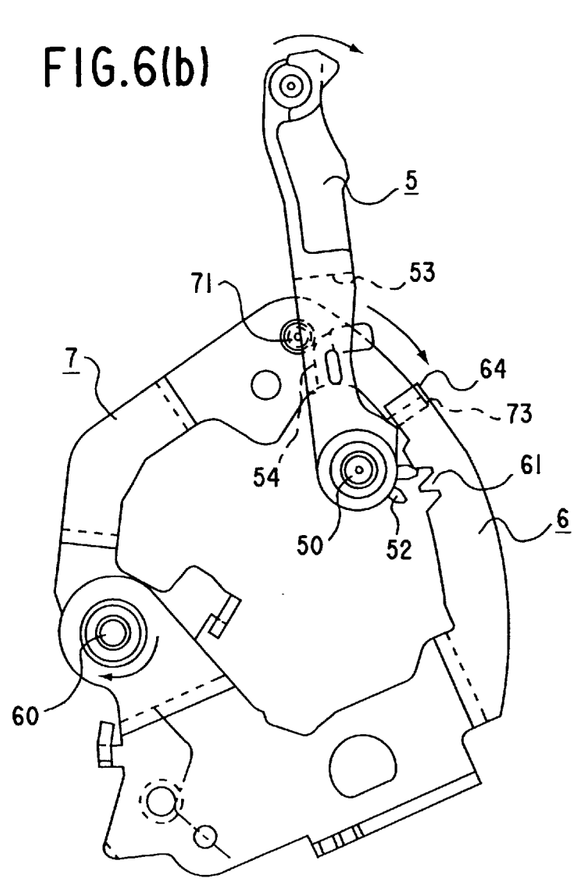
Figure 7A:
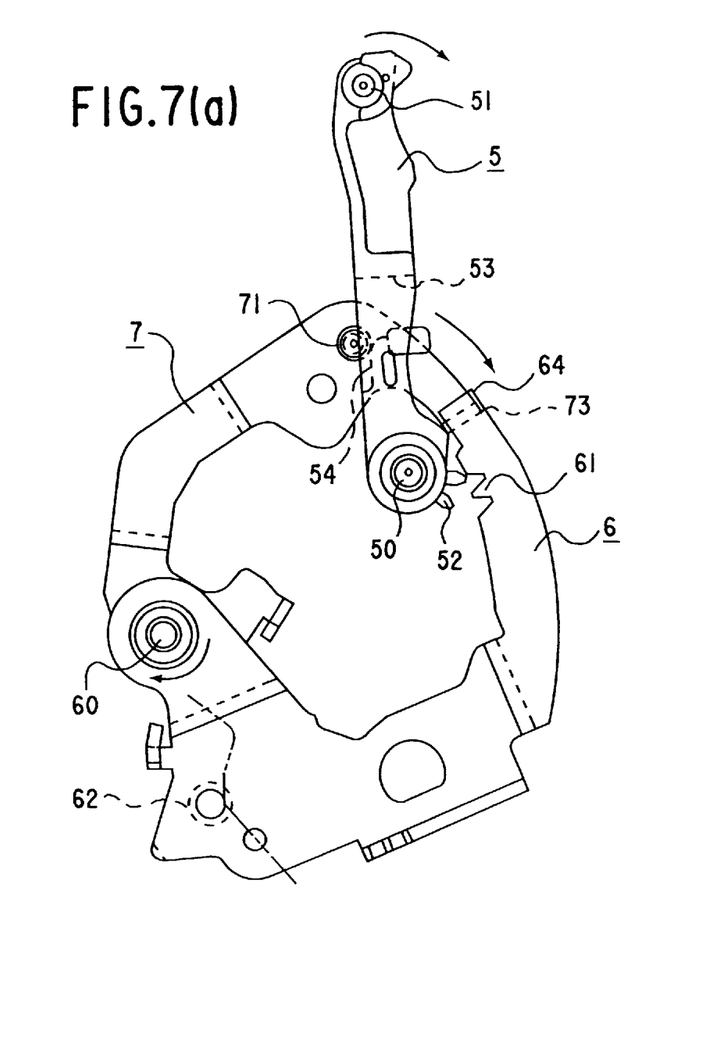
FIGS. 7(a) and 7(b) are views showing a final step of the tape drawing-out movement.

The auxiliary lever 7 thereafter further rotates clockwise as shown in FIGS. 6(b) and 7(a), causing the pin 71 on the lever 7 to move the drawing-out lever 5 clockwise by pressing the face 54 of the lever 5. The movement of the drive lever 6 to the drive end position shown in FIG. 7(b) drives the auxiliary lever 7 to the illustrated final position, bringing the drawing-out lever 5 to the illustrated tape drawing-out end position to complete the tape drawing-out movement.

For the tape drawing-out movement shown in FIG. 3(a) to FIG. 7(b), the drive lever 6, auxiliary lever 7 and tape drawing-out lever 5 are drivingly rotated clockwise against the forces of the respective coiled spring 63, torsion spring 72 and torsion spring 55.

Figure 7B:
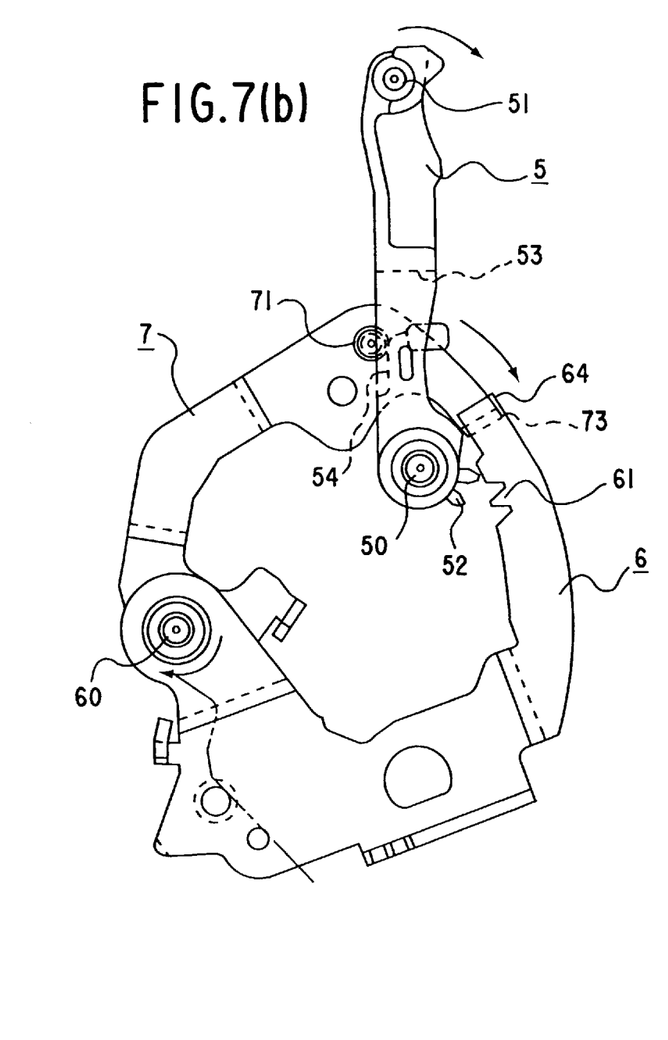

The drawn-out magnetic tape 91 is rewound into the cassette by moving the drive lever 6 from the drive end position shown in FIG. 7(b) to the drive start position shown in FIG. 3(a). In this process, the auxiliary lever 7 and the drawing-out lever 5 move reversely to the tape drawing-out movement described to return to the initial position and the drawing-out start position, respectively.

In the return process, the drive lever 6, auxiliary lever 7 and drawing-out lever 5 smoothly rotate by being biased by the respective coiled spring 63, torsion spring 72 and torsion spring 55.

Figure 2:
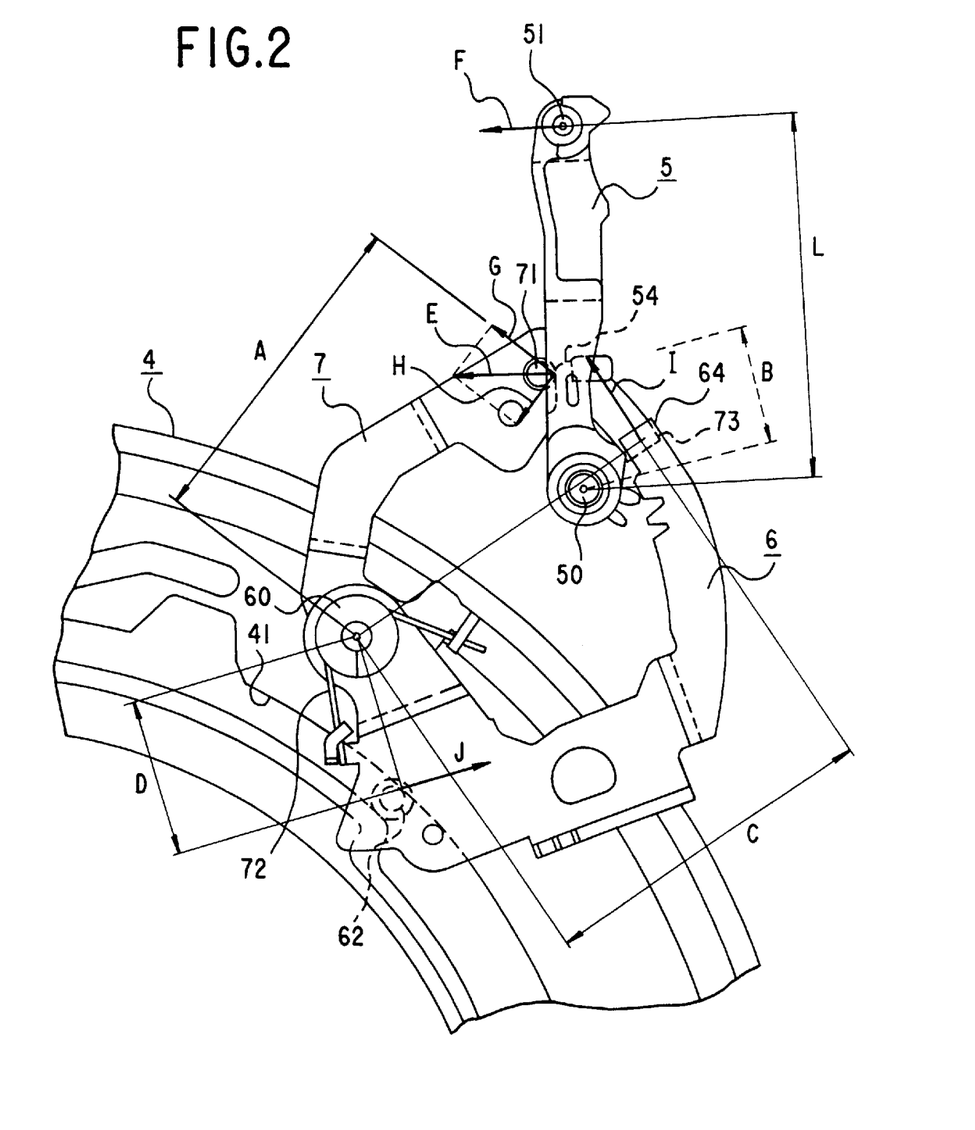
FIG. 2 is a diagram for illustrating the balance of forces in the state of FIG. 1.

With the tape completely drawn out by the mechanism described as shown in FIG. 2, the pressing pin 71 of the auxiliary lever 7 holds the tape drawing-out lever 5 in the drawing-out end position by pressing contact with the face 54 of the lever 5, so that the force F exerted on the tape drawing-out pin 51 of the lever 5 by the tension on the tape is first amplified at the ratio between the radius L of gyration of the drawing-out pin 51 and the radius B of gyration of the pressed point on the face 54 to be pressed to act on the pressing pin 71 of the auxiliary lever 7. This acting force E is resolved into an axial force H acting toward the center of rotation of the lever 7 and torque G perpendicular to the axial force H. The torque G acts as a reaction I on the drive lever 6 through the engagement between the hooks 73, 64 of the respective lever 7 and lever 6. The reaction I is further amplified to the illustrated reaction J at a ratio determined by the radius C' of gyration of the lever hook 64 and the radius D of gyration of the cam follower 62. The reaction J acts on the cam follower 62, which in turn presses the cam face defining the cam groove 41.

With reference to FIG. 2 showing the balance of forces, the radius B of gyration of the pressed point of the drawing-out lever 5 is sufficiently greater than the radius K of pitch circle of the driven gear portion 22 of the conventional tape drawing-out lever 2 shown in FIG. 8, so that the reaction I acting on the hook 64 of the drive lever 6 of the invention shown in FIG. 2 is sufficiently smaller than the reaction Q acting on the drive gear portion 31 of the conventional drive lever 3. There is no great difference between the radius C' of gyration of the drive lever hook 64 of the invention and the radius C of gyration of the drive gear portion 31 of the conventional drive lever 3.

Accordingly, the reaction J acting on the cam follower 62 in the tape drawing-out mechanism of the invention is as small as several times the original force F, and the invention achieves an approximately 50% reduction in the reaction R acting on the cam follower 32 of the conventional tape drawing-out mechanism.

Consequently, the pressure exerted by the cam follower 62 on the cam face defining the cam groove 41 of the drive control plate 4 with the tape drawn out is much smaller than conventionally, obviating the likelihood of early wear on the cam face.

Further even if the force F acting on the pin 51 of the drawing-out lever 5 temporarily increases during playback of the tape, the acting force is sustained by the pressing pin 71 of the auxiliary lever 7. The force E acting on the pin 71 is resolved into an axial force H and torque G as stated above, and the axial force F is reliably supported by the pivot 60, consequently permitting the tape to travel along the specified path accurately, with the tape drawing-out pin 51 positioned free of great errors.

The mechanism of the invention is not limited to the foregoing embodiment in construction but can be modified variously without departing from the spirit of the invention as set forth in the appended claims. For example, the coiled spring 63 shown in FIG. 1 and provided for the drive lever 6 can be dispensed with.

What is claimed is:

1. A tape drawing-out mechanism for positioning a tape serving as a recording medium and as tensioned in a specified path of travel on a chassis, the mechanism comprising:

drive means for giving a drive force for drawing out the tape, a drive lever pivotally supported at a base end thereof on the chassis and pivotally movable between a drive start position and a drive end position for receiving the drive force from the drive means;

a tape drawing-out lever having an outer end provided with a tape drawing-out pin and a base end pivotally supported on the chassis and pivotally movable between a tape drawing-out start position and a tape drawing-out end position, a forward end portion of the drive lever being engageable with the base end of the drawing-out lever in a first step of a tape drawing-out movement to transmit the force of the drive lever to the tape drawing-out lever;

an auxiliary lever pivotally supported at a base end thereof on the chassis and pivotally movable between an initial position and a final position, a forward end of the drive lever being engageable with a forward end of the auxiliary lever in a second step of the tape drawing-out movement to transmit the force of the drive lever to the auxiliary lever, the auxiliary lever being formed with a pressing face for pressing an intermediate portion of the tape drawing-out lever with the movement from the initial position to the final position to move the tape drawing-out lever to the tape drawing-out end position.

2. A tape drawing-out mechanism according to claim 1 wherein the drive lever is formed with a drive gear portion at the forward end portion thereof, while the tape drawing-out lever is formed at the base end with a driven gear portion meshable with the drive gear portion of the drive lever, and the drive gear portion of the drive lever meshes with the driven gear portion in the first step of the tape drawing-out movement.

3. A tape drawing-out mechanism according to claim 1 wherein the forward end of the drive lever and the forward end of the auxiliary lever are respectively formed with hooks meshable with each other in the second step of the tape drawing-out movement.

4. A tape drawing-out mechanism according to claim 1 wherein the drive means comprises a cam groove formed in a drive control plate to be reciprocatingly driven, and a cam follower projecting from an intermediate portion of the drive lever and engaged in the cam groove.

5. A tape drawing-out mechanism according to claim 1 wherein the tape drawing-out lever is biased by a spring from the tape drawing-out end position toward the tape drawing-out start position.

6. A tape drawing-out mechanism according to claim 1 wherein the auxiliary lever is biased by a spring from the final position toward the initial position.

* * * * *

UNITED STATES PATENT AND TRADEMARK OFFICE
CERTIFICATE OF CORRECTION

PATENT NO.:   5,991,116
DATED     :   Nov. 23, 1999
INVENTOR(S):  Haruhiko YONEDA et al.

It is certified that error appears in the above-identified patent and that said Letters Patent is hereby corrected as shown below:

Title page,
Item [73] Change Assignee's name from "Sanyo Electronic Co., Ltd." to --Sanyo Electric Co., Ltd.--

Signed and Sealed this

Tenth Day of October, 2000

*Attest:*

Q. TODD DICKINSON

*Attesting Officer*          Director of Patents and Trademarks